US006873655B2

(12) United States Patent
Comer et al.

(10) Patent No.: US 6,873,655 B2
(45) Date of Patent: Mar. 29, 2005

(54) CODEC SYSTEM AND METHOD FOR SPATIALLY SCALABLE VIDEO DATA

(75) Inventors: Mary Lafuze Comer, Fairmount, IN (US); Izzat Hekmat Izzat, Carmel, IN (US)

(73) Assignee: Thomson Licensing A.A., Boulogne-Billancourt (FR)

( * ) Notice: Subject to any disclaimer, the term of this patent is extended or adjusted under 35 U.S.C. 154(b) by 637 days.

(21) Appl. No.: 09/943,775

(22) Filed: Aug. 31, 2001

(65) Prior Publication Data

US 2002/0090028 A1 Jul. 11, 2002

Related U.S. Application Data

(60) Provisional application No. 60/260,598, filed on Jan. 9, 2001.

(51) Int. Cl.[7] ................................................. H04N 7/12
(52) U.S. Cl. .............................. 375/240.11; 375/240.21; 375/240.24
(58) Field of Search ........................ 375/240.03, 240.08, 375/240.11, 240.18, 240.19, 240.2, 240.21, 240.24, 240.29; 348/420.1, 397.1, 398.1, 399.1, 240.1; 382/235, 248, 250–251, 243; 386/109–111

(56) References Cited

U.S. PATENT DOCUMENTS

| 5,596,369 A | | 1/1997 | Chau ........................... 348/402 |
|---|---|---|---|
| 5,742,343 A | * | 4/1998 | Haskell et al. .......... 375/240.15 |
| 5,745,182 A | | 4/1998 | Yukitake et al. ............. 348/416 |
| 5,751,861 A | | 5/1998 | Astle ........................... 382/250 |
| 5,768,535 A | * | 6/1998 | Chaddha et al. ............. 709/247 |
| 5,852,565 A | * | 12/1998 | Demos ........................ 708/203 |
| 5,903,313 A | | 5/1999 | Tucker et al. ................ 348/416 |
| 5,978,032 A | | 11/1999 | Yukitake et al. ............. 348/416 |
| 5,991,865 A | | 11/1999 | Longhenry et al. ............. 712/7 |
| 6,141,381 A | | 10/2000 | Sugiyama ............... 375/240.16 |
| 6,148,034 A | | 11/2000 | Lipovski ................. 375/240.16 |

(Continued)

OTHER PUBLICATIONS

Nicholls et al., "Scalable video with background segmentation", Proccedings., International Conference on Image Processing, IEEE, vol. 2, pp. 529–532, Sep. 1996.*

Van der Vleuten et al., "Low–complexity scalable image compression", Proceedings., Data Compression Conference, IEEE, pp. 23–32, Mar. 2000.*

(Continued)

Primary Examiner—Vu Le
(74) Attorney, Agent, or Firm—Joseph S. Tripoli; Ronald H. Kurdyla; Guy H. Eriksen

(57) ABSTRACT

A CODEC system for spatially scalable video data includes a decimate unit for performing DCT-based down-sampling with respect to macro block data of input video data to produce decimated block data representing low frequency part of the macro block data, a first encoder for encoding the decimated block data to produce base layer DCT data having DCT coefficients representing the low frequency part, a first decoder for decoding the base layer DCT data from the first encoder to produce base layer block data, an interpolate unit for performing DCT-based interpolation with respect to the base layer block data from the first decoder to produce interpolated base layer block data, a second encoder for encoding enhancement layer block data obtained from the macro block data and the interpolated base layer block data to produce enhancement layer DCT data wherein the enhancement layer block data representing high frequency part of the macro block data, and a second decoder for decoding the enhancement layer DCT data from the second encoder to produce reconstructed macro block data.

16 Claims, 3 Drawing Sheets

U.S. PATENT DOCUMENTS

| | | | |
|---|---|---|---|
| 6,178,205 B1 | 1/2001 | Cheung et al. | 375/240.29 |
| 6,185,340 B1 | 2/2001 | Comer | 382/236 |
| 6,192,080 B1 | 2/2001 | Sun et al. | 375/240.16 |
| 6,208,692 B1 | 3/2001 | Song et al. | 375/240.19 |
| 6,215,823 B1 | 4/2001 | Kim et al. | 375/240.16 |
| 6,219,103 B1 | 4/2001 | Sugiyama | 348/452 |
| 6,233,392 B1 | 5/2001 | Comer | 386/68 |
| 6,269,484 B1 | 7/2001 | Simsic et al. | 725/151 |
| 6,337,881 B1 * | 1/2002 | Chaddha | 375/240.16 |
| 6,493,387 B1 * | 12/2002 | Shin et al. | 375/240.1 |
| 6,728,775 B1 * | 4/2004 | Chaddha | 709/231 |

OTHER PUBLICATIONS

Russell C. Hardie et al., "Ranking In $R^p$ And Its Use In Multivariate Image Estimation", IEEE Transactions on Circuits and Systems for Video Technology, vol. 1, No. 2, Jun. 1991, pp. 197–209.

Ulrich Benzler, "Spatial Scalable Video Coding Using A Combined Subband–DCT Approach", IEEE Transactions on Circuits and Systems for Video Technology, vol. 10, No. 7, Oct. 2000, pp. 1080–1087.

* cited by examiner

CODEC SYSTEM AND METHOD FOR SPATIALLY SCALABLE VIDEO DATA

This application claims the benefit of U.S. Provisional Patent Application Ser. No. 60/260,598 filed Jan. 9, 2001.

The present invention relates to a system for coding and decoding video data, and more particularly, to a system and method for coding and decoding spatially scalable video data.

BACKGROUND OF THE INVENTION

Video data is generally processed and transferred in the form of bitstreams. A bitstream is spatially scalable if the bitstream contains at least one independently decodable substream representing video sequence which is less than the full resolution of the bitstream. The conventional standards for processing video data, such as Moving Pictures Experts Group (MPEG) 2, MPEG 4 and H.263+ standards, include spatial scalability modes.

There have been some problems and difficulties in processing video data using the conventional standards. For example, video data processing for spatially scalable video data is inefficient because decoded enhancement-layer sequence has significantly lower video quality than a non-scalable sequence at the same bit rate.

One improved scheme over the conventional video data processing systems and methods is a discrete cosine transform (DCT)-based subband decomposition approach in which subband decomposition is used to create base and enhancement layer data which are then encoded using motion compensated DCT coding. The DCT-based subband decomposition approach is more completely described in "Spatial scalable video coding using a combined subband-DCT approach", by U. Benzler, October 2000, IEEE, vol. 10, no. 7, pp. 1080–1087.

Although the DCT-based subband decomposition approach provides better efficiency in the spatial scalability mode than the conventional video data processing systems and methods, it still has some disadvantages in processing spatially scalable video data. The disadvantages include the requirement of new quantization matrices for DCT processes. In other words, the DCT-based subband approach creates data whose DCT coefficients are statistically very different from the DCT coefficients of original pixels, and, hence, new quantization matrices for the DCT coefficients must be used to obtain good video quality. The DCT-based subband approach also must be modified to obtain flexibility in varying the relative bit rate allocation between base layer data and enhancement layer data. Thus, an interpolation filter used in the DCT-based subband approach to compute based layer predictions cannot be optimal.

SUMMARY OF THE INVENTION

Therefore, a need exists for a video data CODEC system in which DCT-based decimation and interpolation are performed with respect to spatially scalable video data. It would also be advantageous to provide a video data CODEC system that facilitates DCT-based motion compensation scheme for enhancement layer of the video data.

In accordance with the principles of the present invention, there is provided a code-decode (CODEC) system for encoding and decoding spatially scalable video data, including a decimate unit for performing DCT-based down-sampling with respect to macro block data of input video data to produce decimated block data representing the low frequency portion of the macro block data, a first encoder for encoding the decimated block data to produce base layer DCT data having DCT coefficients representing the low frequency portion, a first decoder for decoding the base layer DCT data from the first encoder to produce base layer block data, an interpolate unit for performing DCT-based interpolation with respect to the base layer block data from the first decoder to produce interpolated base layer block data, a second encoder for encoding enhancement layer block data obtained from the macro block data and the interpolated base layer block data to produce enhancement layer DCT data wherein the enhancement layer block data represents the high frequency portion of the macro block data, and a second decoder for decoding the enhancement layer DCT data from the second encoder to produce reconstructed macro block data.

In an exemplary embodiment of the invention, the first encoder includes a first motion compensate unit for compensating the decimated block data from the decimate unit with base layer data of a previous picture and motion vectors for the macro block data to produce compensated base layer block data so that the first encoder performs DCT with respect to the compensated base layer block data to produce the base layer DCT data.

The second encoder may also include a second motion compensation unit for compensating the enhancement layer block data with enhancement layer data of a previous picture and motion vectors for the macro block data to produce compensated enhancement layer block data so that the second encoder performs DCT with respect to the compensated enhancement layer block data to produce the enhancement layer DCT data.

BRIEF DESCRIPTION OF THE DRAWINGS

This disclosure will present in detail the following description of preferred embodiment with reference to the following figures wherein.

DETAILED DESCRIPTION OF THE PREFERRED EMBODIMENTS

A video data code-decode (CODEC) system according to the present invention employs discrete cosine transform (DCT)-based manipulation (e.g., decimation and interpolation) of video data. DCT-based sampling puts low frequency DCT contents of a block into low resolution pixels of a base layer and leaves pixels containing high frequency DCT contents to be encoded in an enhancement layer. Horizontal and vertical DCT-based decimation and interpolation of a pixel block can be implemented in the spatial domain as a single matrix multiplication, thereby its complexity can be reduced.

In addition to the new DCT-based decimation/ interpolation for spatial scalability, the video data CODEC system of the present invention also employs a new motion compensation scheme that predicts pixels containing low-frequency DCT contents in a base layer and pixels containing high-frequency DCT contents in an enhancement layer from corresponding base layer and enhancement layer, respectively, of the previous reconstructed picture. In this approach of the present invention, a single set of motion vectors is used for both the base layer and the enhancement layer.

The video data CODEC system of the present invention applying to spatial scalability modes does not have the disadvantages of the conventional CODEC systems such as the DCT-based subband approach. Since the DCT-based sample-rate conversion in the present invention is matched to DCT contents used for the subsequent coding of pixels or prediction errors, good performance can be obtained using the same quantization matrices as those used for a non-scalable CODEC. Thus, the quantization matrices can be optimized. The video data CODEC system with new spatial scalability algorithm is described in detail below.

Figure 1:
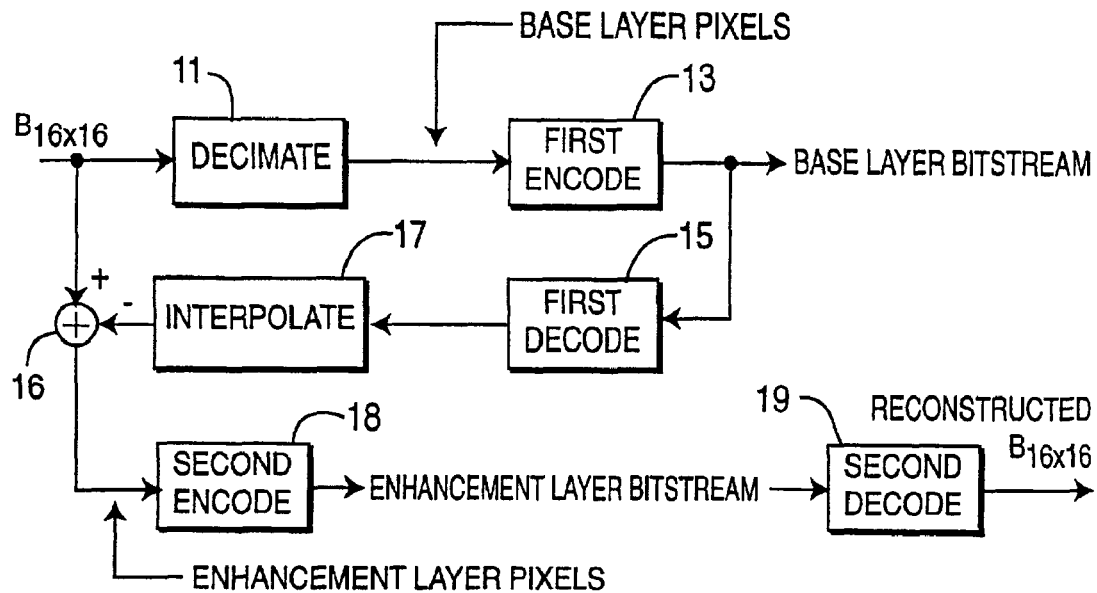
FIG. 1 is a block diagram of a CODEC system according to a preferred embodiment of the present invention.

Referring to FIG. 1, there is provided a block diagram for illustrating the creation of the base and enhancement layer data for a macro block of input video data using DCT-based decimation and interpolation. A CODEC system of the present invention includes a decimate unit 11, a first encoder 13, a first decoder 15, an interpolate unit 17, a second encoder 18, and a second decoder 19. The CODEC system receives video data in the form of frames each of which has a predetermined number of blocks. Each block may have a predetermined size, that is, a predetermined number of pixels. For the purpose of the description, it is assumed that video data is applied to the CODEC system in the form of 16×16 blocks in sequence. A 16×16 macro block data $B_{16 \times 16}$ applied to the CODEC system is inputted into the decimate unit 11. The decimate unit 11 performs DCT-based decimation with respect to the input macro block $B_{16 \times 16}$. Preferably, the decimation is independently performed on each of the four 8×8 blocks in the 16×16 macro block so that the macro block is converted into an 8×8 block.

The first encoder 13 encodes the decimated block data output from the decimate unit to obtain base layer data containing low frequency contents of the macro block $B_{16 \times 16}$. The first encoder 13 also performs motion compensation with respect to the block data from the decimate unit 11 using base layer data of the previous picture. The first decoder 15 decodes the encoded data from the first encoder 11 to produce 8×8 block data.

The interpolate unit 17 performs DCT-based interpolation with respect to the 8×8 block data received from the first decoder 15 to produce a 16×16 macro block. The original macro block data $B_{16 \times 16}$ is subtracted by the macro block data output from the interpolate unit 17 in the adder.

The second encoder 18 encodes the output data of the adder 16 to obtain enhancement layer data containing high frequency contents of the input macro block data $B_{16 \times 16}$. In the second encoder 18, motion compensation is performed with respect to the output data of the adder 16 using enhancement layer data of the previous reconstructed picture. The second decoder 19 decodes the encoded data received from the second encoder 18 to produce reconstructed 16×16 macro block data. Each block of the CODEC system in FIG. 1 is described in detail below.

Figure 2:
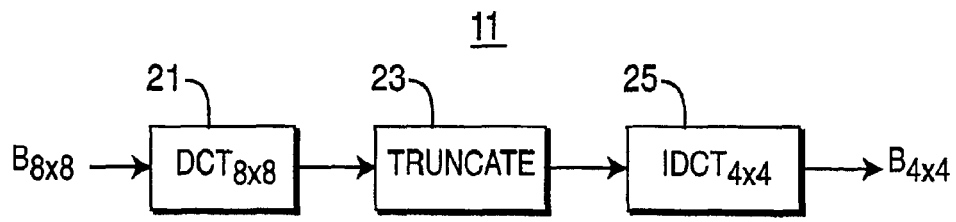
FIG. 2 is a block diagram of the decimate unit in FIG. 1 according to a preferred embodiment of the present invention.

Referring to FIG. 2, there is provided a block diagram of the decimate unit 11 in FIG. 1 according to a preferred embodiment of the present invention. Since the decimate unit 11 performs DCT-based decimation with respect to each of the four 8×8 blocks in the macro block, an 8×8 DCT unit 21 receives an 8×8 block data $B_{8 \times 8}$ and transforms the block into 8×8 DCT coefficients to be provided to a truncate unit 23. In the truncate unit 23, all of the 8×8 DCT coefficients except for the low frequency coefficients, for example, the upper left 4×4 DCT content, are discarded. The remaining low frequency coefficients are provided to a 4×4 inverse DCT (IDCT) unit 25 and transformed into a 4×4 block data $B_{4 \times 4}$. This series of decimation or down-sampling operations can be represented by the equation (1).

$$B_{4 \times 4} = M_1 B_{8 \times 8} M_2 \qquad (1)$$

Here, $M_1$ is a 4×8 matrix and $M_2$ is an 8×4 matrix. To obtain the base layer 4×4 block $B_{4 \times 4}$, the 8×8 block $B_{8 \times 8}$ is vertically down-sampled with matrix $M_1$ and horizontally down-down-sampled with matrix $M_2$.

Figure 3:
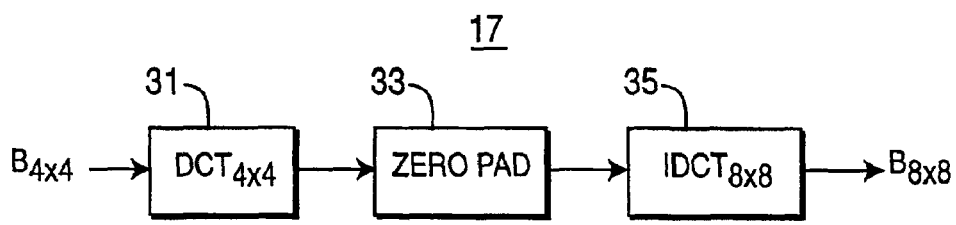
FIG. 3 is a block diagram of the interpolate unit in FIG. 1 according to a preferred embodiment of the present invention.

Referring to FIG. 3, there is provided a block diagram of the interpolate unit 17 in FIG. 1 according to a preferred embodiment of the present invention. The interpolate unit 17 performs DCT-based interpolation with respect to each of four 4×4 blocks in an input 8×8 block. A 4×4 DCT unit 31 receives a 4×4 block data $B_{4 \times 4}$ to transform the block $B_{4 \times 4}$ into 4×4 DCT coefficients. In a zero pad unit 33, the 4×4 block of DCT coefficients is padded with zeros to form an 8×8 block of DCT coefficients. An 8×8 IDCT unit 35 receives the 8×8 DCT coefficients from the zero pad unit 33 and produce an interpolated 8×8 block data. This series of interpolation or up-sampling operations can be represented by the equation (2).

$$B_{8 \times 8} = H_1 B_{4 \times 4} H_2 \qquad (2)$$

Here, $H_1$ is an 8×4 matrix and $H_2$ is a 4×8 matrix. To obtain the interpolated 8×8 block $B_{8 \times 8}$, the 4×4 block $B_{4 \times 4}$ is vertically down-sampled with matrix $H_1$ and horizontally down-sampled with matrix $H_2$.

Figure 4:
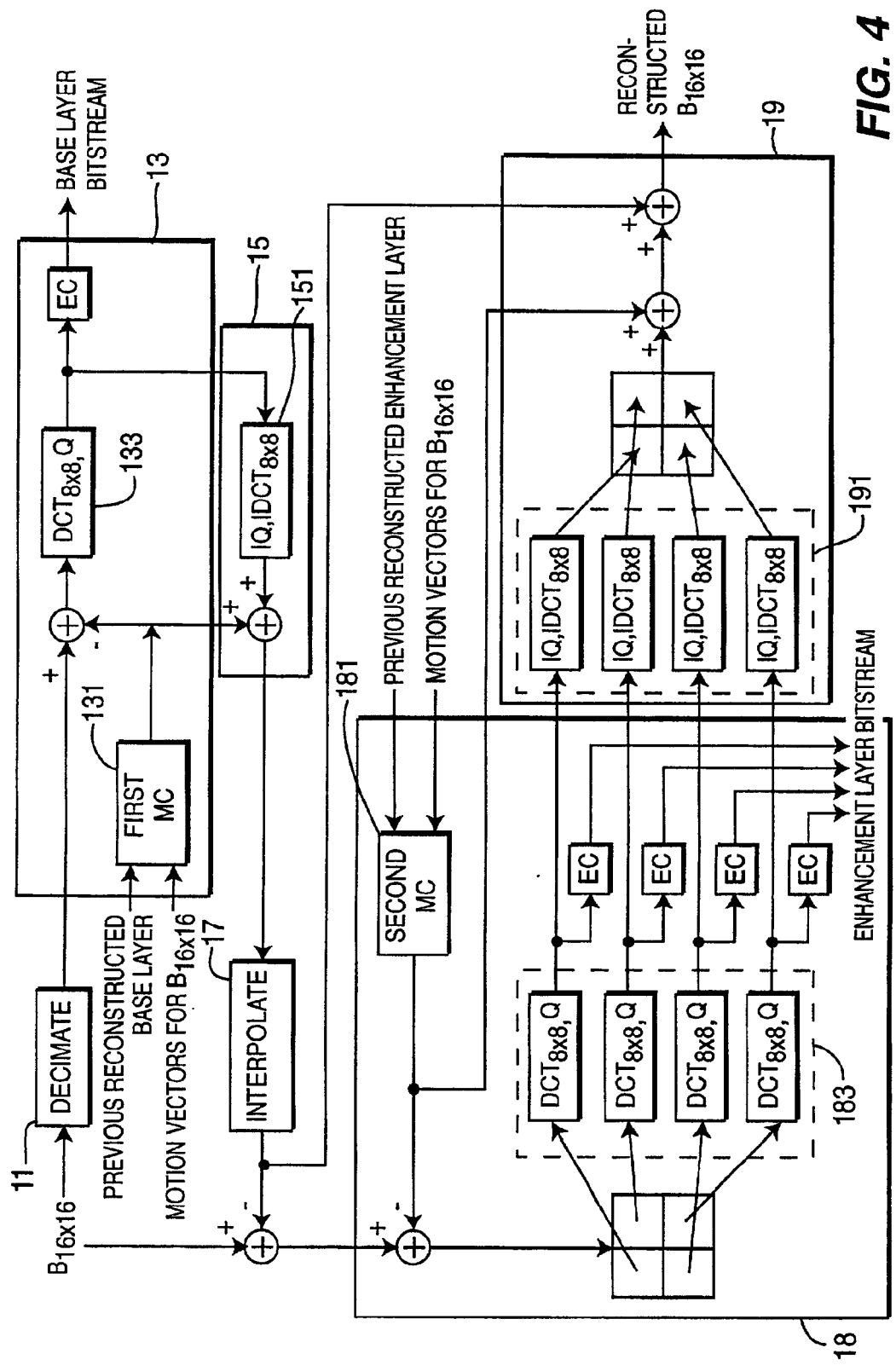
FIG. 4 is a more detailed block diagram of the CODEC system in FIG. 1.

Referring to FIG. 4, there is provided a block diagram for illustrating in detail the first and second encoders 13, 18 and the first and second decoders 15, 19 in FIG. 1. It should be noted that the detailed block diagram in FIG. 4 shows an exemplary embodiment of the present invention for the purpose of description. The first encoder 13 includes a first motion compensation unit 131 for compensating the decimated block data from the decimate unit 11 and a DCT and quantization unit 133 for transforming a 8×8 block of the compensated base layer data into 8×8 DCT coefficients which is then quantized. The quantized DCT coefficients are preferably entropy coded (EC) to produce base layer bitstream. The base layer bitstream will be reconstructed for the use of motion compensation of the next picture.

Figure 5:
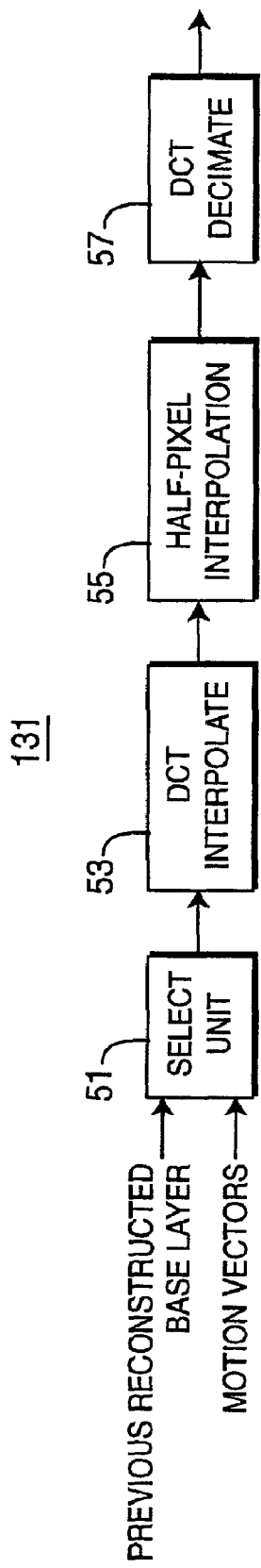
FIG. 5 is a block diagram of the first motion compensation unit in FIG. 4 according to a preferred embodiment of the present invention.

Referring to FIG. 5, there is provided a block diagram of the first motion compensation unit 131 in FIG. 4 according to a preferred embodiment of the present invention. In the first motion compensation unit 131, a select unit 51 receives base layer data of the previous reconstructed picture and motion vectors for the 16×16 macro block data to select a block of pixels to be predicted from the previous reconstructed base layer data. It is assumed that motion estimation has been performed at the full resolution. Preferably, one motion vector is used for each 8×8 block This block of pixels is obtained after dividing the motion vector for the block in half, since the motion estimation has been performed at full resolution and the base layer frames have only half as many pixels in both the horizontal and vertical directions as the full-resolution frames.

An interpolate unit 53 performs DCT-based interpolation with respect to the block of pixels selected by the select unit 51 to produce a prediction block with full resolution. The full resolution prediction block may be subject to half-pixel interpolation 55, if necessary, using simple bilinear interpolation. The motion compensation will be done with half-pixel accuracy by use of the half-pixel interpolation. In other words, a motion vector may point to a location halfway between two pixels in a reference frame, in which case the prediction is computed using interpolation. The need to do half-pixel interpolation is indicated by an odd value for the motion vector. A decimate unit 57 performs DCT-based decimation to down-sample the full resolution prediction block from the interpolate block or the half-pixel interpolated block to produce a base layer prediction block.

Referring again to FIG. 4, the base layer prediction block generated from the first motion compensation unit 131 is subtracted from the decimated block data to obtain the compensated base layer block data. The base layer prediction block is also provided to the first decoder 15 and added to an output of an IDCT and inverse quantization unit 151 which performs IDCT and inverse quantization (IQ) with respect to the output of the DCT and quantization unit 133 in the first encoder 13. In this embodiment, the DCT, IDCT, quantization, IQ, and entropy coding (EC) are well known in the art, thus a detailed description thereof is omitted.

Figure 6:
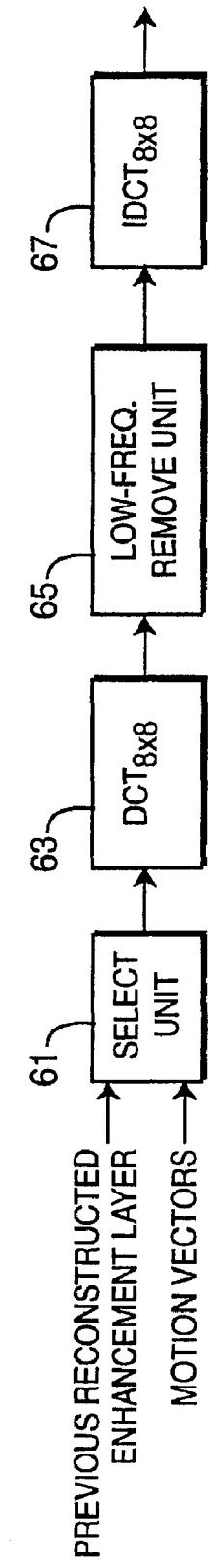
FIG. 6 is a block diagram of the second motion compensation unit in FIG. 4 according to a preferred embodiment of the present invention.

Referring to FIG. 6, there is provided a block diagram of a second motion compensation unit 181 in the second encoder 18 according to a preferred embodiment of the present invention. In the second motion compensation unit 181, a select unit 61 receives enhancement layer data of the previous reconstructed picture and motion vectors for the 16×16 macro block data to select a block of pixels to be predicted from enhancement layer data of the previous reconstructed picture. A DCT unit 63 converts the block of pixels to be predicted into 8×8 DCT coefficients. Upon receiving the DCT coefficients, a low frequency remove unit 65 removes low frequency contents of the 8×8 DCT coefficients by setting low frequency DCT coefficients to zero. As a result, the block of pixels to be predicted for the enhancement layer motion compensation contains only high frequency DCT coefficients. An IDCT unit 67 converts the high frequency DCT coefficients into an 8×8 block data.

Such enhancement layer motion compensation process is preferably implemented as a matrix multiplication for each of the horizontal and vertical directions. In other words, to implement the enhancement layer motion compensation, the operations shown in the DCT unit 63, the low frequency remove unit 65, and the IDCT unit 67 can be combined into a pre-multiplication of the DCT unit 63 input by one matrix for vertical processing and a post-multiplication by another matrix for horizontal processing. This is much the same as the implementation of the decimate unit 11 and the interpolate unit 17 in FIGS. 2 and 3, respectively, using matrix multiplication as shown in Equations (1) and (2).

Referring again to FIG. 4, block data output from the second motion compensation unit 181 is subtracted from the block data obtained by subtracting the output of the interpolate unit 17 from the input macro block data $B_{16 \times 16}$. As a result, compensated enhancement layer block data is obtained. In DCT and quantization units 183, each of four 8×8 blocks of the compensated enhancement layer block data (16×16) is converted into 8×8 DCT coefficients which are then quantized to produce enhancement layer DCT data. The second decoder 18 generates enhancement layer bitstream by entropy coding the enhancement layer DCT data from each of the DCT and quantization units 183.

The second decoder 19 has IQ and IDCT units 191 each for performing inverse quantization and inverse DCT with respect to the enhancement layer DCT data provided from a corresponding one of the DCT and quantization units 183 in the second encoder 18. The IQ and IDCT units 191 produce enhancement layer block data (i.e., 16×16 macro block) by combining four 8×8 blocks each generated from the respective IQ and IDCT units 183. The enhancement layer block data is added to the output of the second motion compensation unit 181, and a result thereof is also added to the output of the interpolate unit 17 to produce a reconstructed macro block data. The two additions in the second decoder 19 correspond to the two subtractions which are the subtraction of the output of the interpolate unit 17 from the input macro block data $B_{16 \times 16}$ and the subtraction of the output of the second motion compensation unit 181 from the difference obtained by the previous subtraction.

In FIG. 4, the first and second encoders 13, 18 have the DCT and quantization units 133, 183 and the first and second decoders 15, 19 have the IQ and IDCT units 151, 191. It should be noted that the DCT and quantization functions or IQ and IDCT functions are combined into one unit only for the purpose of simplifying the embodiment in FIG. 4. The quantization, IQ, DCT, and IDCT may be implemented in separate units respectively.

In a preferred embodiment of the present invention, there is provided a method for coding and decoding spatially scalable video data, including the steps of decimating macro block data of input video data by performing DCT-based down-sampling to obtain decimated block data representing low frequency part of the macro block data, encoding the decimated block data to obtain base layer DCT data having DCT coefficients representing the low frequency part, decoding the base layer DCT data to obtain base layer block data, interpolating the base layer block data by performing DCT-based up-sampling with respect to the base layer block data to produce interpolated base layer block data, subtracting the interpolated base layer block data from the macro block data to obtain enhancement layer block data representing high frequency part of the macro block data, encoding the enhancement layer block data to obtain enhancement layer DCT data, and decoding the enhancement layer DCT data to obtain reconstructed macro block data.

The encoding the decimated block data step may include performing motion compensation of the decimated block data, wherein the motion compensation includes selecting a block of pixels to be predicted from base layer data of a previous picture using motion vectors for the macro block data, performing DCT-based interpolation with respect to the block of pixels to be predicted to produce full resolution prediction block data, decimating the full resolution prediction block data by performing DCT-based down-sampling to produce base layer prediction block data, and subtracting the base layer prediction block data from the decimated block data to obtain compensated base layer block data which is subject to DCT to produce the base layer DCT data.

The encoding the enhancement layer block data step may also include performing motion compensation of the enhancement layer block data, wherein the motion compensation includes selecting a block of pixels to be predicted from enhancement layer data of a previous picture using motion vectors for the macro block data, performing DCT with respect to the block of pixels to be predicted to produce a block of DCT coefficients, removing low frequency contents of the block of DCT coefficients, performing IDCT with respect to the DCT coefficients in which the low frequency contents are removed, to obtain enhancement layer prediction block data, and subtracting the enhancement layer prediction block data from the enhancement layer block data to obtain compensated enhancement layer block data which is subject to DCT to produce the enhancement layer DCT data.

Having described preferred embodiments of a CODEC system for spatially scalable video data according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A spatially-scalable video encoding apparatus comprising:
   a decimate unit for performing DCT-based down-sampling with respect to macro block data of input video data to produce decimated block data representing low frequency part of the macro block data;
   a first encoder for encoding the decimated block data to produce base layer DCT data having DCT coefficients representing the low frequency part;
   a first decoder for decoding the base layer DCT data from the first encoder to produce base layer block data;
   an interpolate unit for performing DCT-based interpolation with respect to the base layer block data from the first decoder to produce interpolated base layer block data;
   a second encoder for encoding enhancement layer block data obtained from the macro block data and the interpolated base layer block data to produce enhancement layer DCT data, the enhancement layer block data representing high frequency part of the macro block data; and
   a second decoder for decoding the enhancement layer DCT data from the second encoder to produce reconstructed macro block data,
      wherein the decimate unit includes:
      a first DCT unit for performing DCT with respect to an input block to
   produce a block of DCT coefficients;
      a truncate unit for selecting a low frequency part of the block of DCT coefficients provided from the first DCT unit; and
      a first IDCT unit for performing IDCT with respect to the low frequency part of the block of DCT coefficients selected by the truncate unit to produce an output block.

2. The spatially-scalable video encoding apparatus of claim 1 wherein the output block has a size equal to a quarter of the input block.

3. The spatially-scalable video encoding apparatus of claim 1 wherein the decimate unit performs vertical down-sampling with a first matrix and horizontal down-sampling with a second matrix with respect to the input block.

4. A spatially-scalable video encoding apparatus comprising:
   a decimate unit for performing DCT-based down-sampling with respect to macro block data of input video data to produce decimated block data representing low frequency part of the macro block data;
   a first encoder for encoding the decimated block data to produce base layer DCT data having DCT coefficients representing the low frequency part;
   a first decoder for decoding the base layer DCT data from the first encoder to produce base layer block data;
   an interpolate unit for performing DCT-based interpolation with respect to the base layer block data from the first decoder to produce interpolated base layer block data;
   a second encoder for encoding enhancement layer block data obtained from the macro block data and the interpolated base layer block data to produce enhancement layer DCT data, the enhancement layer block data representing high frequency part of the macro block data; and
   a second decoder for decoding the enhancement layer DCT data from the second encoder to produce reconstructed macro block data,
      wherein the first encoder includes a first motion compensate unit for compensating the decimated block data from the decimate unit with base layer data of a previous picture and motion vectors for the macro block data to produce compensated base layer block data so that the first encoder performs DCT with respect to the compensated base layer block data to produce the base layer DCT data.

5. The spatially-scalable video encoding apparatus of claim 4 wherein the first motion compensation unit includes:
   a first select unit for selecting a block of pixels to be predicted from the base layer data of the previous picture using the motion vectors for the macro block data;
   an interpolate unit for performing DCT-based interpolation with respect to the block of pixels to be predicted to produce full resolution prediction block data;
   a second decimate unit for performing DCT-based down-sampling with respect to the full resolution prediction block data to produce base layer prediction block data; and
   an adder for subtracting the base layer prediction block data from the decimated block data to obtain the compensated base layer block data.

6. The spatially-scalable video encoding apparatus of claim 5 wherein the first motion compensation unit further includes a half-pixel interpolate unit for performing an interpolation with half-pixel accuracy with respect to the full resolution prediction block data, output data of the half-pixel interpolate unit being provided to the second decimate unit.

7. A spatially-scalable video encoding apparatus comprising:
   a decimate unit for performing DCT-based down-sampling with respect to macro block data of input video data to produce decimated block data representing low frequency part of the macro block data;
   a first encoder for encoding the decimated block data to produce base layer DCT data having DCT coefficients representing the low frequency part;
   a first decoder for decoding the base layer DCT data from the first encoder to produce base layer block data;
   an interpolate unit for performing DCT-based interpolation with respect to the base layer block data from the first decoder to produce interpolated base layer block data;
   a second encoder for encoding enhancement layer block data obtained from the macro block data and the interpolated base layer block data to produce enhancement layer DCT data, the enhancement layer block data representing high frequency part of the macro block data; and
   a second decoder for decoding the enhancement layer DCT data from the second encoder to produce reconstructed macro block data, wherein the interpolate unit includes:
  a second DCT unit for converting an input block into a first block of DCT coefficients;
  a zero pad unit for padding the first block of DCT coefficients with zeros to produce a second block of DCT coefficients; and
  a second IDCT unit for performing IDCT with respect to the second block of DCT coefficients to produce an output block.

8. The spatially-scalable video encoding apparatus of claim 7 wherein the input block has a size equal to a quarter of the output block.

9. The spatially-scalable video encoding apparatus of claim 7 wherein the interpolate unit performs vertical up-sampling with a third matrix and horizontal up-sampling with a fourth matrix with respect to the input block.

10. A spatially-scalable video encoding apparatus comprising:
  a decimate unit for performing DCT-based down-sampling with respect to macro block data of input video data to produce decimated block data representing low frequency part of the macro block data;
  a first encoder for encoding the decimated block data to produce base layer DCT data having DCT coefficients representing the low frequency part;
  a first decoder for decoding the base layer DCT data from the first encoder to produce base layer block data;
  an interpolate unit for performing DCT-based interpolation with respect to the base layer block data from the first decoder to produce interpolated base layer block data;
  a second encoder for encoding enhancement layer block data obtained from the macro block data and the interpolated base layer block data to produce enhancement layer DCT data, the enhancement layer block data representing high frequency part of the macro block data; and
  a second decoder for decoding the enhancement layer DCT data from the second encoder to produce reconstructed macro block data,
    wherein the second encoder has a second motion compensation unit for compensating the enhancement layer block data with enhancement layer data of a previous picture and motion vectors for the macro block data to produce compensated enhancement layer block data so that the second encoder performs DCT with respect to the compensated enhancement layer block data to produce the enhancement layer DCT data.

11. The spatially-scalable video encoding apparatus of claim 10 wherein the second motion compensation unit includes:
  a second select unit for selecting a block of pixels to be predicted from the enhancement layer data of the previous picture using the motion vectors for the macro block data;
  a third DCT unit for performing DCT with respect to the block of pixels to be predicted to produce a block of DCT coefficients;
  a low frequency remove unit for removing low frequency contents of the block of DCT coefficients;
  a third IDCT for performing IDCT with respect to output data of the low frequency remove unit to obtain enhancement layer prediction block data; and
  an adder for subtracting the enhancement layer prediction block data from the enhancement layer block data to obtain the compensated enhancement layer block data.

12. The spatially-scalable video encoding apparatus of claim 11 wherein the low frequency remove unit removes the low frequency contents by setting low frequency DCT coefficients to zero.

13. A method for performing spatially-scalable video encoding operations comprising:
  decimating macro block data of input video data by performing DCT-based down-sampling to obtain decimated block data representing low frequency part of the macro block data;
  encoding the decimated block data to obtain base layer DCT data having DCT coefficients representing the low frequency part;
  decoding the base layer DCT data to obtain base layer block data;
  interpolating the base layer block data by performing DCT-based up-sampling with respect to the base layer block data to produce interpolated base layer block data;
  subtracting the interpolated base layer block data from the macro block data to obtain enhancement layer block data representing high frequency part of the macro block data;
  encoding the enhancement layer block data to obtain enhancement layer DCT data; and
  decoding the enhancement layer DCT data to obtain reconstructed macro block data,
    wherein the decimating step includes the steps of:
      performing DCT with respect to an input block of the macro block data to produce a block of DCT coefficients;
      truncating the block of DCT coefficients by selecting a low frequency part of the block of DCT coefficients; and
      performing IDCT with respect to the low frequency part of the block of DCT coefficients to produce the decimated block data.

14. The method of claim 13, wherein the encoding the decimated block data step includes performing motion compensation of the decimated block data, the motion compensation including the steps of:
  selecting a block of pixels to be predicted from base layer data of a previous picture using motion vectors for the macro block data;
  performing DCT-based interpolation with respect to the block of pixels to be predicted to produce full resolution prediction block data;
  decimating the full resolution prediction block data by performing DCT-based down-sampling to produce base layer prediction block data; and
  subtracting the base layer prediction block data from the decimated block data to obtain compensated base layer block data which is subject to DCT to produce the base layer DCT data.

15. The method of claim 13, wherein the interpolating step includes the steps of:
  performing DCT with respect to an input block to obtain a first block of DCT coefficients;
  padding the first block of DCT coefficients with zeros to produce a second block of DCT coefficients; and
  performing IDCT with respect to the second block of DCT coefficients to obtain the interpolated base layer block data.

16. The method of claim 13, wherein the encoding the enhancement layer block data step includes performing motion compensation of the enhancement layer block data, the motion compensation includes the steps of:

selecting a block of pixels to be predicted from enhancement layer data of a previous picture using motion vectors for the macro block data;

performing DCT with respect to the block of pixels to be predicted to produce a block of DCT coefficients;

removing low frequency contents of the block of DCT coefficients;

performing IDCT with respect to the DCT coefficients in which the low frequency contents are removed, to obtain enhancement layer prediction block data; and subtracting the enhancement layer prediction block data from the enhancement layer block data to obtain compensated enhancement layer block data which is subject to DCT to produce the enhancement layer DCT data.

* * * * *